March 27, 1928.
J. D. BROWER, JR
1,663,971
DIRECTION INDICATOR
Filed May 31, 1921
3 Sheets-Sheet 1
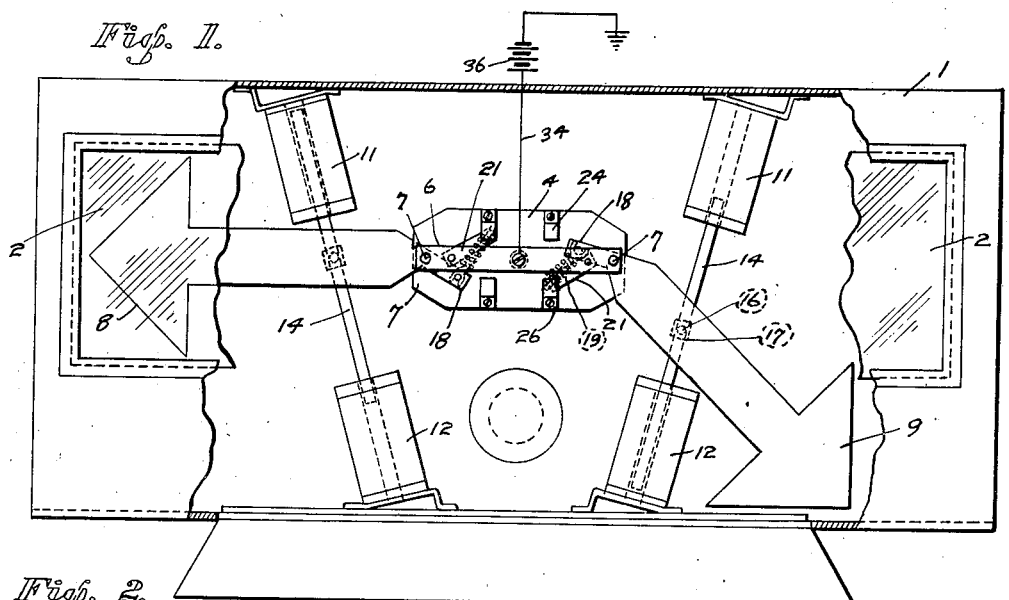
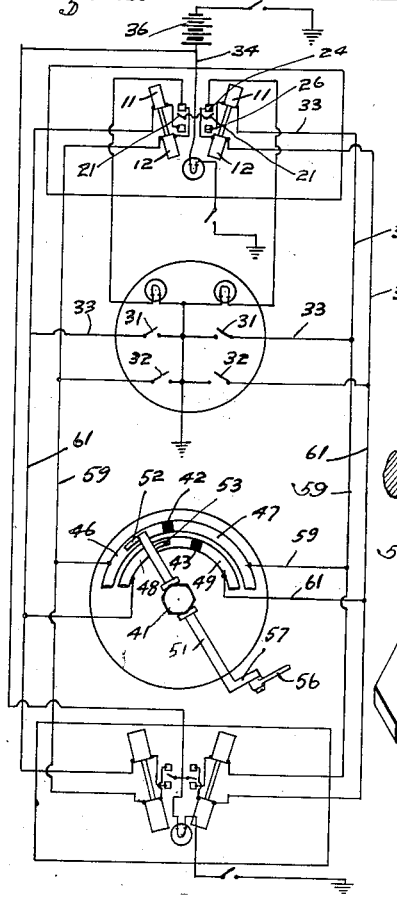
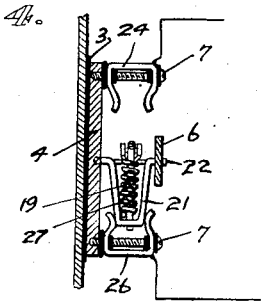
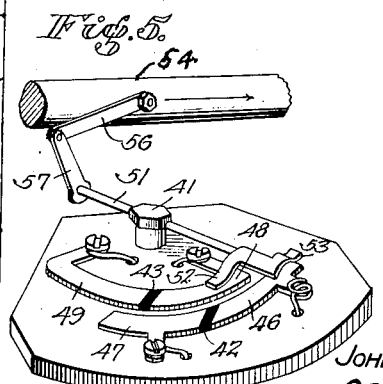
INVENTOR.
JOHN D. BROWER JR.
BY
ATTORNEYS.

March 27, 1928.
J. D. BROWER, JR
DIRECTION INDICATOR
Filed May 31, 1921
1,663,971
3 Sheets-Sheet 2
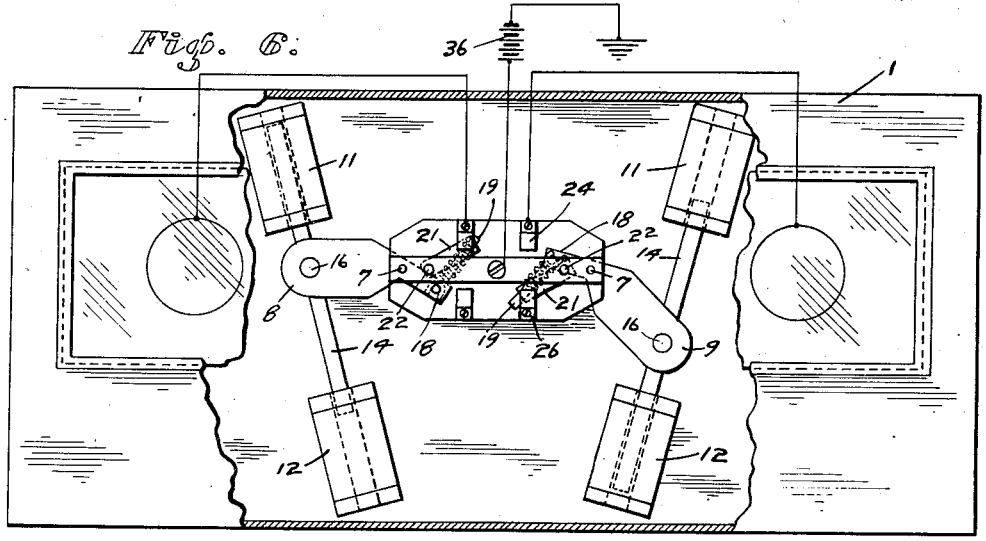
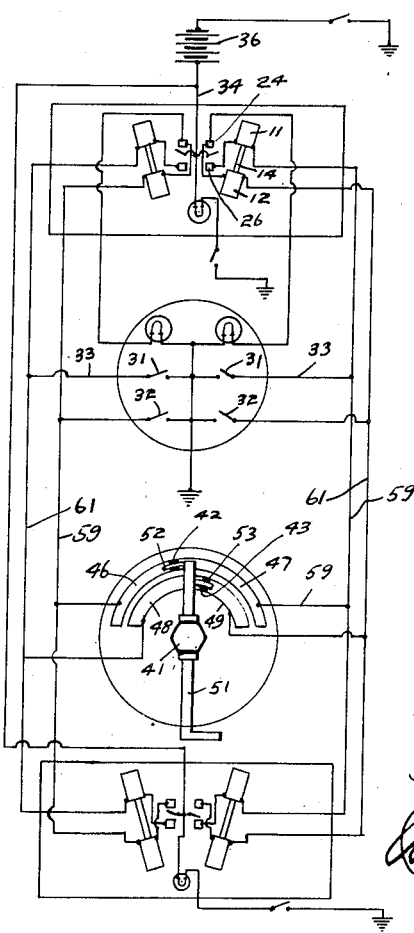
INVENTOR.
JOHN D. BROWER JR.
ATTORNEYS.

March 27, 1928.

J. D. BROWER, JR
DIRECTION INDICATOR
Filed May 31, 1921

1,663,971

3 Sheets-Sheet 3

INVENTOR.
JOHN D. BROWER JR.
BY
ATTORNEYS.

Patented Mar. 27, 1928.

1,663,971

UNITED STATES PATENT OFFICE.

JOHN D. BROWER, JR., OF PIEDMONT, CALIFORNIA.

DIRECTION INDICATOR.

Application filed May 31, 1921. Serial No. 473,603.

The present invention relates to improvements in direction indicating devices and its particular object is to provide a direction indicator for motor vehicles adapted to indicate to persons approaching or following the automobile when a turn or a stop of the latter is intended to be made. A further object of my invention is to provide an indicator of the class described that is electrically controlled and adapted to be operated by hand as well as automatically. More particularly it is the object of my invention to provide an indicator which will allow the driver to indicate in advance what turn he intends to make, but is at the same time so constructed, that, when the driver fails to operate the device, it will operate itself automatically as soon as the steering gear is beginning to turn. Another object of my invention is to provide the indicator with means, by which the indicator automatically returns to its non-indicating position as soon as the steering apparatus turns to a straight-ahead position, without interfering with the manual control. Other objects and advantages will appear as the specification proceeds.

Figure 7:
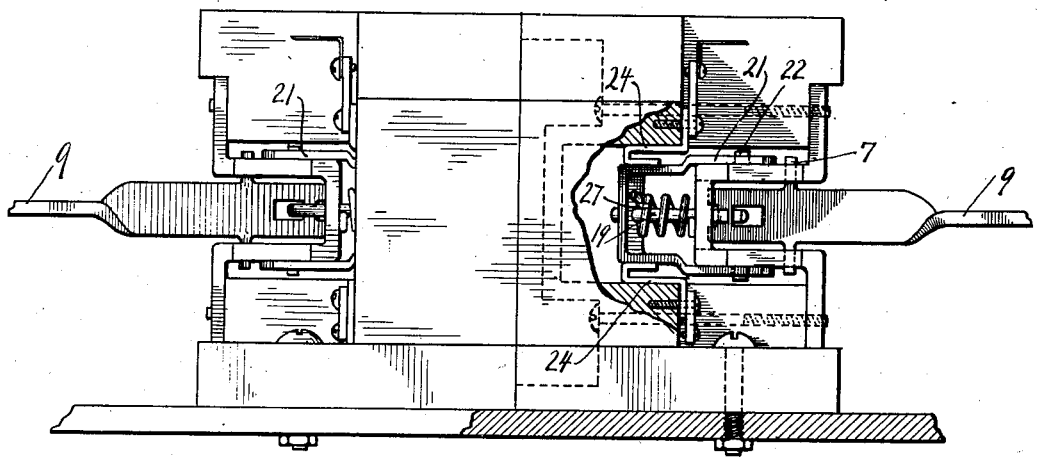
Figure 8:
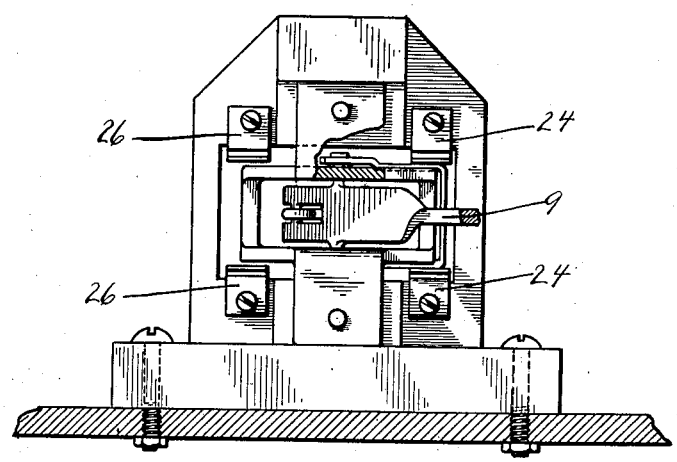

I preferably attain these objects by means of the mechanism illustrated in the accompanying drawing, in which Figure 1 is a front view of my indicating device, Figure 2 a diagrammatic view illustrating the wiring and the controls of the device, Figure 3 the same diagrammatic view illustrating a different position, Figure 4 an enlarged sectional view along line 4—4 of Figure 1, showing my switch mechanism in detail, Figure 5 a detail perspective view of an automatic switching device shown in Figure 2, Figure 6 a modification of the arrangement shown in Figure 1, Figure 7 a side view, partly in section, of a modified form of the switch shown in Figure 4, and Figure 8 an end view of the switch shown in Figure 7.

Referring to the drawing in detail, a box 1, having two windows 2 therein, is secured to the front end or the rear end of the automobile or preferably to both ends. In the box there is secured, parallel to its rear wall but separated therefrom by the insulating material 3, a metal plate 4, parallel to which runs, some distance apart from the same, a second narrower plate 6, the two being connected by two pins 7 near their outer ends. These pins 7 serve at the same time as pivots for two indicating arms 8 and 9. When either of these arms is raised to a horizontal position, it shows up through its window and indicates that the driver intends to turn in the direction of the raised arm. When both arms are raised it indicates a stop and when both arms are lowered to the slanting position of the right arm in Figure 1, no signal is shown.

Each of these arms is actuated by means of two solenoids 11 and 12 and it is a particular feature of my device that either arm, while being raised or lowered, interrupts the current actuating it, while closing a gap in the circuit adapted to actuate it in the opposite direction and that it automatically locks itself in its new position by means independent of the solenoids.

The actuating means for each arm consists of a plunger 14, the center of which is pivotally secured to the arm intermediate of its length as at 16. Either end of the arm extends partly into one of the solenoids 11 and 12 and is drawn further into the one or the other when a current is passed through the same. Since the arm pivots on the pin 7, the point 16 will have a slightly circular motion and allowance should be made for such motion either by a slot 17 in the arm or by other means. The arm extends at a slant beyond its pivot 7 and its outer end 18 pivotally engages one end of a guide rod 19, the other end of which extends through the bottom of a yoke switch 21, the two arms of which are pivotally supported at their upper ends, between and in the plates 4 and 6, as shown at 22, the latter point being substantially in horizontal alinement with the pivot 7. The switch 21 is in operative proximity with two contacts 24 and 26 and can be swung on its pivot from one to the other. A spring 27 is interposed between the bottom of the switch and the top of the guide rod 19.

The contacts 24 and 26 are members of two different circuits, one of which I shall hereafter refer to as the arm raising circuit, and the other as the arm lowering circuit. Either of the two circuits is provided with another switch within convenient reach of the driver, the two switches being indicated in Figure 2 at 31 and 32. The arm raising circuit comprises the switch 31, the wire 33, the solenoid 11, the contact 26, the switch 21, the plates 4 and 6, the wire 34, the battery 36, and ground connections between the battery 36 and the switch 31. The arm lowering circuit comprises the switch 32, the wire 37, the solenoid 12, the contact 24, the switch 21, the plates 4 and 6, the wire 34, the battery 36 and ground connections between the battery 36 and the switch 32.

The part of my device thus far described works as follows: Referring to the right hand side and assuming that arm 9 is to be raised, the switch 31 is closed. Since switch 21 is in contact with 26, the arm raising circuit is thereby closed, the solenoid 11 energized, the plunger 14 drawn upward into the solenoid 11, and the arm 9 raised on its pivot 7. This forces down the end 18 of the extension of the arm, whereby the guide 19 is pressed into the bottom of the switch 21, compressing the spring 27, until the guide rod is alined with the pivot 7. At that time it has passed the pivot of the switch 22, and the spring has a tendency to force the bottom of the switch upward, which tendency increases as the end 18 of the extension travels further down, until it forces the switch upward into contact with 24, thereby breaking the contact 26, and opening the arm raising circuit, while closing one of the two gaps in the arm lowering circuit, which may now be completely closed at any time by closing the switch at 32. In the meantime the spring 27 holds the arm in its horizontal position, until its resistance is overcome by the operation of the arm lowering circuit.

Various additions and modifications may be introduced into the device thus far described without affecting the operation of the same, as for instance the introduction of tell-tale lights 38 into the arm raising circuit by means of the wire 39 leading from the contact 24 through the lights to the ground, or the modification shown in Figure 5, in which the outer ends of the arms are dispensed with altogether as indicators and lights introduced instead, which may be connected in the same way as the tell-tale lights, that is, through the contacts 24.

The device thus far described is operative manually altogether. To make it more efficient and to guard against possible neglect, on the part of the driver, I equip my system also with an automatic switching device 41 operated by the steering mechanism. This device comprises two concentric semi-circular metallic arcs each of which is divided into two sections by non-conducting blocks 42 and 43 so that in all they furnish four metallic contacts 46 and 47, 48 and 49. Over these arcs is suspended, pivotally supported in the center of the same and with freedom of rocking motion, a shaft 51, one end of which carries two oppositely arranged wiper springs 52 and 53, the two being radially spaced to allow the former to be brought into wiping contact with the metal members 46 and 47 when the shaft is rocked one way, to the left, in Figure 3 of the drawing, while the latter may be brought into contact with 48 and 49 upon a rocking motion of the shaft in the opposite direction. A combined rocking and revolving motion may be imparted to the shaft by any element of the steering mechanism as, for instance, the steering wheel rim if the device is supported near the steering wheel, or the drag link or the tie rod of the steering mechanism if the device is supported in the vicinity of the front axle. In the perspective view of Figure 5, the element 54 may be considered the tie rod of the steering mechanism. The remote end of the shaft 51 has an arm 57 fixed thereto, the arm being preferably arranged to point straight upwardly when the shaft 51 occupies the position shown in Figure 3, and its free end being connected to a point of the tie rod 54 by means of a link 56. The latter link should be dimensioned so that the overall length of the link 56 and the arm 57 exceeds the distance between the shaft 51 and the tie rod and should be sufficiently flexible to compensate for the difference in direction of travel of the tie rod and the end of the shaft 51, the tie rod moving rectilinearly and the end of the shaft 51 moving on the arc of a circle. Since the latter arc normally need not exceed one-eighth of the circle, its departure from a straight line is not sufficiently pronounced that it could not be easily compensated for by a loose connection between the link 56 and the arm 57 or by making the link 56 flexible.

It will be seen from the foregoing description that if the tie rod, due to operation of the steering wheel, moves from a neutral position to the left, as viewed in Figure 3, it will first rock the shaft 51 to bring the wiper spring 52 in contact with the section 46 of the arc and then revolve the shaft 51 so as to cause the wiper spring 52 to ride over the sections 46 and 47 from left to right, while a movement of the tie rod in the opposite direction will cause the wiper arm 53 to become active in a similar manner.

The member 54 is grounded as shown at 58 and the contact sections of the metallic arms are connected into the respective arm raising and arm lowering circuit as follows: 47 and 48 into the arm raising circuits through wires 59, and 46 and 49 into the arm lowering circuits through wires 61.

This automatic switch works in conjunction with the manually operated switch as follows: The wiring diagram of Figure 3 indicates the position of the various parts during a straight forward travel, both arms being lowered. The arm raising circuit is closed at the contact 26, and open at the manually operated switch 31 and the automatic switch, the two wipers of the latter being above the insulating blocks 42 and 43 altogether. The arm lowering circuit is open at all three points. The driver intends to turn to the left. He closes the arm raising circuit at 31 (left side) which raises the arm, at the same time breaking the circuit at 26 and making a contact at 24. He then begins to turn his steering wheel to the left. This causes the steering gear member 54 to rock the shaft 51 clockwise, so as to bring the wiper 53 in firm contact with the inner ring at the contact 49, so as to be sure that the opposite arm is lowered. As the turn proceeds, the arm wipes the insulating block and then over the contact 48, thereby closing a contact in the arm raising circuit. But it will be remembered that the arm has been lifted already and the circuit been broken at 26, so that the closing of the contact at 48 is without any effect whatever, in this instance. Supposing, however, that the driver had failed to close the switch 31 before he began to turn then the closing of the contact at 48 would find the contact at 26 still closed and it would lift the arm.

Now we are in the position indicated in Figures 1 and 2. The next thing the driver will do in finishing his turn is to turn his wheel to the right, to straighten the course of the automobile. The member 54, pulling on link 56 and through it on the arm 57 in the opposite direction, now brings wiper 52 in contact with the contact 46, thereby closing the arm lowering circuit, its contact 24 having been closed during the raising of the arm. Thus the arm will be dropped automatically as soon as the steering wheel is set for going straight ahead.

In case the driver fails to make an intended turn, after having lifted the arm by closing the contact at 31, he may drop the arm by the manually operated switch 32.

A stop may be indicated by lifting both arms simultaneously. To provide against giving the stopping sign accidentally by the automatic switching device, the two insulating blocks should be set so as to never allow the two wipers to work both arm raising contacts at the same time or in very close succession. If they are arranged as indicated in the drawing, it will be noticed that the automatic device can at no time close an arm raising circuit before first actuating the other arm lowering circuit.

I claim:

1. In a device of the character described, two indicating signals, two circuits associated with each signal having means incorporated therein for positively actuating the signal in opposite senses and each signal having means associated therewith for opening its actuating circuit and closing the other circuit when rendered active, a switch for controlling the signals comprising a base having two parallel conducting contact ways each way being intercepted substantially intermediate its ends by a relatively short length of insulation, thereby dividing each length of insulation into two electrically separate segments, two electrically integral grounding contact fingers, one for each way, means for mounting the fingers for sliding movement one respectively over each way and for selectively contacting the respective ways singly when the mounting means is moved in one or the other of two opposite senses, a conductor between each of said segments and one of the signal circuits, and other conductor means for completing the electrical circuits of the system.

2. A switch for an indicating device of the character described comprising a pivoted rod mounted for rocking motion having wiper arms extending in opposite directions and in radially spaced relation from one end thereof, two contact segments mounted underneath the said wiper arms allowing either wiper arm to contact its respective segment when the rod is rocked, an arm fixed to the other end of the rod and means engaging the free end of the arm for pulling the same to the right or to the left, the arm being arranged to first rock the rod at the reversal of the pull so as to reverse the wiper arm contact.

3. A switch for an indicating device of the character described comprising a pivoted rod mounted for rocking motion having wiper arms extending in opposite directions and in radially spaced relation from one end thereof, two contact segments mounted underneath the said wiper arms allowing either wiper arm to contact its respective segment when the rod is rocked, insulating blocks in each segment dividing the same in two sections and spaced circumferentially to correspond to the circumferential spacing of the wiper arms so as to allow both wiper arms to remain inactive when disposed above the insulating blocks, an arm fixed to the other end of the rod and means engaging the free end of the arm for pulling the same to the right or to the left, the arm being arranged to first rock the rod at the reversal of the pull so as to reverse the wiper arm contact.

4. A direction indicator of the character described comprising a pivoted indicating signal, two electro-magnets mounted on opposite sides thereof, a single plunger operating in the two magnets and pivotally engaging the arm with an intermediate portion thereof allowing the arm to be pulled in either direction when one or the other of the electro-magnets is rendered active, an extension of the signal beyond its pivot and means associated therewith for automatically biasing the signal in either end position, the latter means having also means incorporated therein for automatically rendering the electro-magnet inactive after setting the signal.

JOHN D. BROWER, Jr.